United States Patent [19]

Sartore

[11] 4,199,454

[45] Apr. 22, 1980

[54] FILTER

[76] Inventor: Michael A. Sartore, 3309 Riviera Dr., Sarasota, Fla. 33582

[21] Appl. No.: 895,142

[22] Filed: Apr. 10, 1978

[51] Int. Cl.² .......................................... B01D 35/06
[52] U.S. Cl. ................................... 210/222; 210/488; 210/497.1
[58] Field of Search ............. 210/222, 223, 488, 497.1

[56] References Cited

U.S. PATENT DOCUMENTS

| | | | |
|---|---|---|---|
| 3,035,703 | 5/1962 | Pall | 210/223 |
| 3,221,882 | 12/1965 | Frantz | 210/223 |
| 3,371,790 | 3/1968 | Kudlaty et al. | 210/223 |
| 3,727,761 | 4/1973 | Aspinwall et al. | 210/223 X |
| 3,785,498 | 1/1974 | Fernandez | 210/488 X |
| 4,052,312 | 10/1977 | King | 210/223 |

Primary Examiner—John Adee
Attorney, Agent, or Firm—Robert D. Farkas

[57] ABSTRACT

This disclosure pertains to a filter apparatus utilizing a helically wound spring element adapted with a cap closing one end thereof. The other end of the spring is fed with the liquid or gas which is to be filtered. The spring may be permanently magnetized, or when electrically energized, be an electromagnet which magnetically constrains particles possessing magnetic properties within the chamber formed by the capped spring. The core of the spring may contain permanent magnets therein. The spring may be adjustably tensioned by an axially aligned screw which selectively compresses or elongates the spring thereby altering the opening size between the turns of the spring. The adjustment screw may be fabricated from a magnetic material causing the magnetic field to be concentrated thereabout, increasing the effectiveness of retaining magnetically sensitive particles within the confines of the spring.

8 Claims, 3 Drawing Figures

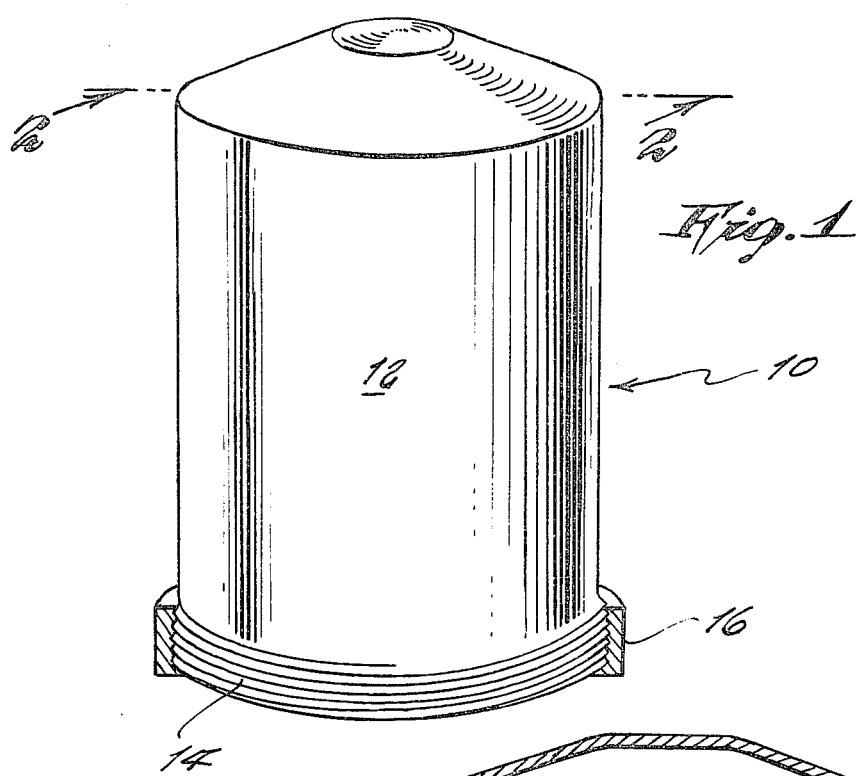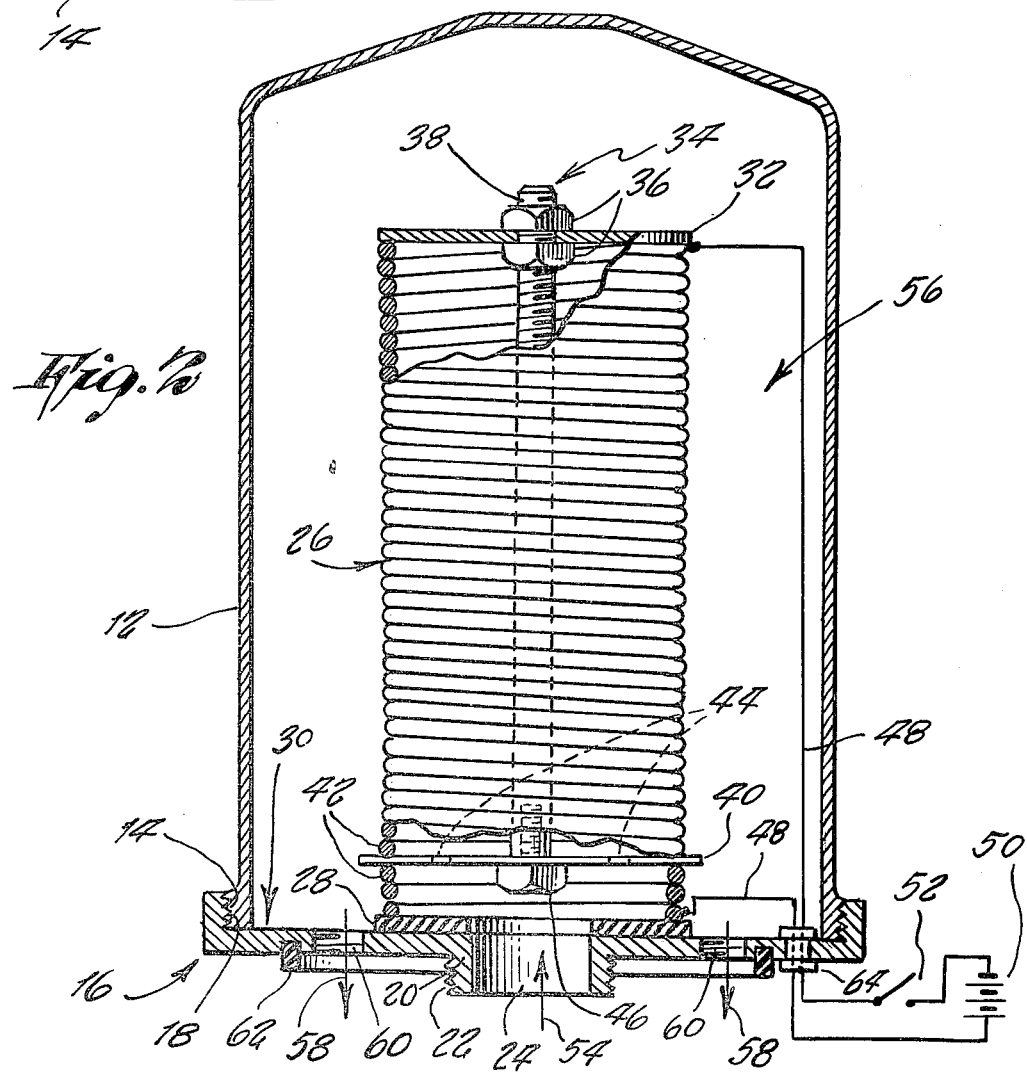

FILTER

BACKGROUND OF THE INVENTION

1. Field of the Invention

This invention relates to filtering devices and more particularly to that class utilizing springs as the filter medium.

2. Description of the Prior Art

The prior art abounds with filter devices utilizing tubular screens or springs as a dirt trapping element.

Typical of a tubular screen filter is U.S. Pat. No. 3,584,685 issued on June 15, 1971 to D. M. Boyd, which teaches a tubular screen formed by the helical winding and attachment of a continuous rod member around a plurality of spaced longitudinal bar members in a manner sufficient to provide a continuous helical slot opening of continuously increasing slot width. Thus, the Boyd patent teaches an apparatus suitable for filtering particles of maximum width narrower than the widest slot width.

U.S. Pat. No. 2,342,669 issued on Feb. 29, 1944 to A. C. Hoffman discloses a helically wound spring which is adjustably compressible utilizing an exterior adjustment screw therefor. Openings, of controlled size, are disposed around the periphery of the turns of the spring element by the processes of either etching away portions of the diameter of the spring wire comprising the spring or by building up the thickness of portions of the diameter of the spring wire comprising the spring utilizing the process of plating therefor.

SUMMARY OF THE INVENTION

A primary object of the present invention is to provide a filtering apparatus which magnetically retains magnetically susceptible particles within a confined area.

Another object of the present invention is to provide a filtering apparatus which combines mechanical and electrical filtering actions.

Still another object of the present invention is to provide a filtering apparatus which can be adjusted to effectively filter out particles of various sizes, by a simple mechanical adjustment and/or an electrical adjustment.

Yet another object of the present invention is to provide a filtering apparatus which is reusable, easily cleaned, and economical in manufacture.

Heretofore, helical springs have been used to filter out liquids and gases, wherein a chamber is formed by the spring into which is fed the unpurified fluid. The purified fluid, emerging through the interstices of adjacent coil elements, causes abutting adjacent elements to spread slightly apart overcoming the inherent or externally induced compressive tendencies urging adjacent turns to contact each other. When an external adjustable compressing element is used to force adjacent turns into tighter abutting engagement, the filter element tends to resist the free flow of purified fluid from within the spring to the area immediately adjacent the exterior portions of the spring. Should the spring be devoid of compressive forces, or in fact be expandingly tensioned, larger volumes of fluid can pass through the interstices of the windings with greater ease accompanied by particles of large size.

The present invention utilizes magnetic forces to entrap magnetically, particles that are magnetically susceptible. This is accomplished by either fabricating the spring from a magnetized material, such as steel, or by passing an electrical current through the wire comprising the spring which is covered with an insulating material such as a layer of plastic or lacquer. A magnetically susceptible rod, or a rod being permanently magnetized, may be disposed coaxially aligned with the longitudinal axis of the spring. Such a rod may be utilized to adjustably vary the compressive forces exerted on the spring thereby whilst serving as a magnetic field concentrating element which assists in capturing magnetically susceptible particles from the unpurified fluid. The rod may simply be magnetically passive, responding only to the magnetic field induced by the magnetized spring coil elements, or be magnetically active in its own right, such as by being permanently magnetized. Other permanent magnets, in rod form, or in wool form, may be included in the confines of the spring.

These objects as well as other objects of the present invention, will become more readily apparent after reading the following description of the accompanying drawings.

BRIEF DESCRIPTION OF THE DRAWINGS

FIG. 1 is a perspective view of the present invention.

FIG. 2 is a front elevational cross-sectional view of the present invention taken along line 2—2 viewed in the direction of arrows 2—2 as shown in FIG. 1.

DESCRIPTION OF THE PREFERRED EMBODIMENT

Figure 3:
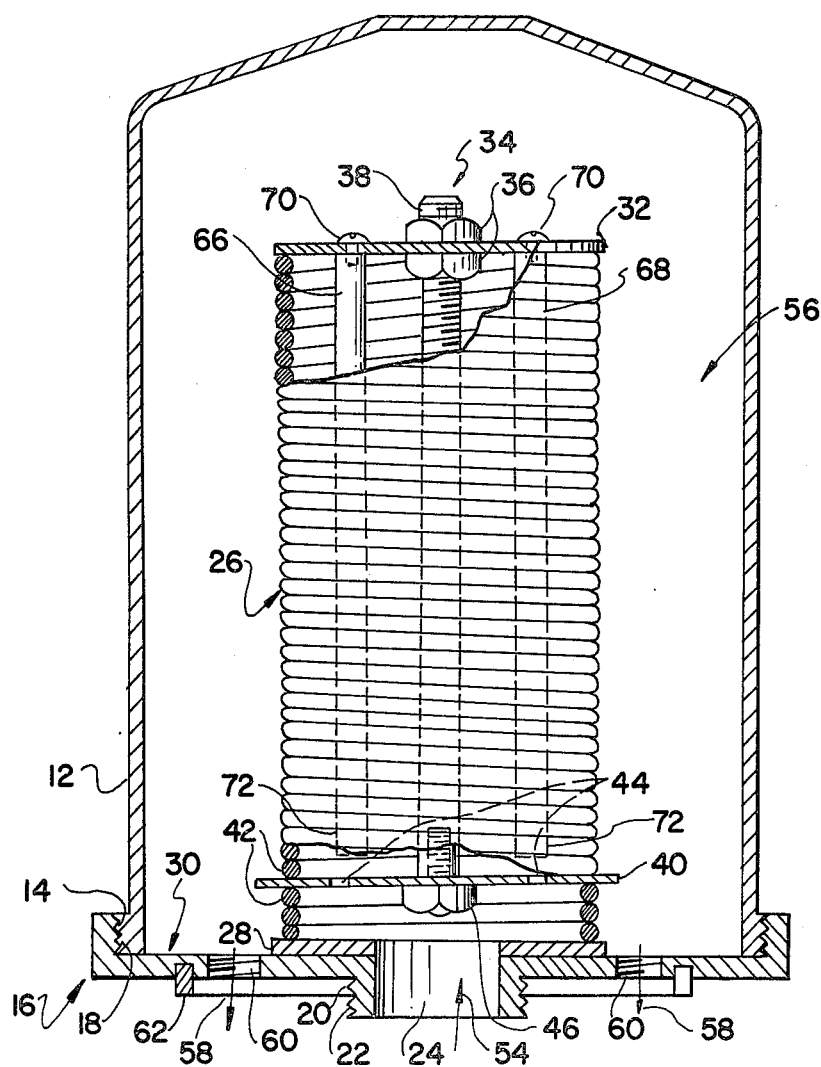
FIG. 3 is a front elevational cross-sectional view of an alternate embodiment of the present invention taken along line 2—2 viewed in the direction of arrows 2—2 as shown in FIG. 1.

The structure and method of fabrication of the present invention is applicable to a housing having a substantially cylindrical shape forming a cup-like structure with external threads on the exterior surface thereof adjacent an open mouth portion. A base is provided which is adapted with an upturned flange having internal threads which may threadingly engage the external threads on the exterior surface of the cup-like element. A central opening in the base communicates to the interior of a helical coil fabricated from either magnetized steel or from a non-magnetic, spring-like material, such as Phosphor bronze. Each turn of the spring may be fully encased within an insulating material such as lacquer or a coating of suitable plastic. One end of the spring is fastened to an annular ring fabricated from an insulating material, devoid of magnetic properties. The other face of the insulated annular ring is secured to the internal face of the base and is centered about the central opening in which unpurified fluid is introduced. The other end of the spring is capped by a plate which possesses minimally electrical insulating properties and contains a hole having the threaded end of a rod passing therethrough. A pair of nuts are disposed on each side of the plate and are threaded upon the rod. The other end of the rod contacts another insulating plate. A bolt, passing through the hole in the other plate locks the other end of the rod to the other plate. The other plate extends radially outwardly from the rod and is captured intermediate a pair of adjacent turns of the spring at the end thereof closest to the fluid intake port in the base element.

Two or more fluid outlet ports are provided in the base element and are disposed outside the region thereof contacted by the helical spring. A pair of wires are attached to the ends of the helical spring and pass through a fluid tight grommet installed in an opening in the base element. Energizing power may be obtained through a battery source and an on-off switch. When the instant apparatus is in use with a motor vehicle, the switch may be closed when the ignition switch of the vehicle is placed into an operating position. An annular rubber-like gasket is secured to the outermost surface of the base, for use in permitting the purified fluid to be coupled to a surface containing exit ports for such purified fluids without leakage.

Unpurified fluid enters the confines of the spring. The filtering action takes place by allowing the fluid to emerge from the interstices formed by adjacent turns of the spring. The adjustment rod determines the force and location between adjacent turns of the spring, thereby controlling macroscopic particle size of contaminents which are to be retained within the confines of the spring. The magnetic field, obtained either from the permanent magnetization of the spring itself, or from magnetic rods or magnetized wool, located in the confines of the spring, or from the magnetic field produced by passing a direct current through the spring turns, further acts so as to inhibit microscopic magnetic particles from passing through the spring. This magnetic effect may be enhanced by the magnetization of the adjustment rod disposed co-axially within the spring. The compartment formed by the spring confines the contaminants, whilst the compartment in which the spring resides fills with purified fluid. An entrance port is coupled to the interior of the spring element as an exit port is coupled to the compartment housing the spring element. By removing the cup-like housing and by adjusting the adjustment rod so as to lengthen the spring, the accumulated debris retained within the spring may be flushed away, permitting the apparatus to be replaced into service.

Now referring to the Figures, and more particularly to the embodiment illustrated in FIG. 1 showing the present invention 10 having an outermost cup-like housing 12 to which are affixed external threads 14. A base portion 16 threadingly engages the cup-like housing 12.

FIG. 2 illustrates the cross-section of cup-like housing 12 wherein external threads 14 threadingly engage internal threads 18 of base element 16. A pipe portion 20 is shown secured to base element 16 and is adapted with external threads 22 and opening 24. Spring 26 is secured at one end to annular ring 28. The other end of annular ring 28 is secured to the innermost surface 30 of base portion 16. Ring 28 is fabricated from a non-conducting material devoid of magnetic properties. Annular plate 32 is secured to the other end of spring 26 and is fabricated from an insulating material. Adjustment rod 34 passes through an opening in annularly shaped plate 32 and is locked thereto by locking nuts 36 threadingly engaged upon external threads 38 disposed on the surface of rod 34. Annular plate 40 is secured between adjacent turns 42 of spring 26 and is provided with a plurality of small holes 44 passing therethrough being fabricated from a non-conducting material. Screw 46 is threadingly engaged within internal threads, not shown, of rod 34 and clamps rod 34 to plate 40. In the embodiment employing electromagnetic forces to capture magnetically sensitive particles within the confines of spring 26, wires 48 are shown connected to each end of spring 26. Battery source 50 is coupled to wires 48 when switch 52 is closed. Adjustment rod 34 may be fabricated from a magnetizable material which when magnetized, aids in the retention of magnetically sensitive particles within the confines of spring 26.

Fluid entering opening 24 in the direction of arrow 54, passes through holes 44 communicating with the remainder of the chamber formed by the interior of spring 26 and plate 32. Chamber 56 fills with fluid which passes through interstices of adjacent turns of spring 26 and communicates outwardly from chamber 56, in the direction of arrows 58 after passing through openings 60, disposed in base portion 16. Annular washer 62 confines exiting fluid, passing through openings 60, to a surface against which base element 16 is secured, such as by threading pipe element 20 thereinto. Grommet 64 prevents leakage of purified fluid from compartment 56 at the locale at which wires 48 pass through base element 16.

FIG. 3 illustrates an alternate embodiment of the apparatus shown in FIGS. 1 and 2, wherein permanent magnets, in the form of rods 66 and 68, extend downwardly from annular plate 32, secured thereto by bolts 70, so as to be contained within the confines of spring 26. Ends 72, of permanent magnets 66 and 68 are spaced apart from plate 40 even when spring 26 is in its most compressed state. Adjustment rod 34 may be fabricated from a non-magnetic material, as desired, or may be fabricated from magnetizable material so as to provide a magnetic core passing through the center of spring 26. Annular plate 32 may also be fabricated from a magnetic material so as to bring one end, the upper end, of spring 26 to one magnetic pole, contrasted with the other pole, located adjacent openings 60. If desired, magnetic rods 66 and 68 may be of different lengths, permitting the distribution of the magnetic field, within the interior of spring 26 and the interstices thereof, to be adjusted for maximum magnetic uniformity, or if desired, non-linear magnetic force distribution along the length of spring 26. Rods 66 and 68 may be replaced with, or supplemented with wool (not shown) fabricated from a magnetic material, permanently magnetized and placed within the confines of spring 26.

One of the advantages of the present invention is a filtering apparatus which magnetically retains magnetically susceptible particles within a confined area.

Another advantage of the present invention is a filtering apparatus which combines mechanical and electrical filtering actions.

Still another advantage of the present invention is a filtering apparatus which can be adjusted to effectively filter out particles of various sizes, by a simple mechanical adjustment and/or an electrical adjustment.

Yet another advantage of the present invention is a filtering apparatus which is re-usable, easily cleaned, and economical to manufacture.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

I claim:

1. A filter comprising a helical spring, a housing, said spring being disposed within said housing, means to communicate a fluid to be filtered to a first compartment including the interior portions of said spring, means to communicate outwardly filtered fluid from a second compartment including the interior portions of said housing and the exterior portions of said spring, means to provide a bi-directional magnetic field operating between the interstices formed by adjacent turns of said spring and within said first compartment, said means to provide said magnetic field including said spring being fabricated from an electrical conducting material, a source of electrical current being coupled to the ends of said spring, said adjacent turns of said spring being covered with an insulating non-magnetizable coating.

2. The filter as claimed in claim 1 further comprising means to variably adjust the length of said spring by stretching or compressing.

3. The filter as claimed in claim 2 wherein said length adjusting means comprises a rod, said rod being disposed within said first compartment, one end of said rod being fixedly secured to a first plate, said first plate being fixedly secured adjacent one end of said spring, a second plate, the other end of said rod passing through an opening in said second plate, said second plate being disposed fixedly secured to the other end of said spring, means to adjust the location of said second plate along the length adjacent said other end of said rod.

4. The filter as claimed in claim 1 further comprising at least one permanent magnet disposed within said first compartment and extending substantially co-axially aligned therewith.

5. The filter as claimed in claim 3 wherein said rod is a permanent magnet.

6. The filter as claimed in claim 1 further comprising a switch, said switch interrupting the flow of current provided by said source to said spring.

7. The filter as claimed in claim 1 wherein said means to communicate comprises one end of said spring fixedly secured to an interior surface of said housing, an opening passing through the walls of said housing communicating with said first compartment.

8. The filter as claimed in claim 7 wherein said outwardly communicating means comprises at least one opening within said housing being disposed communicating with said second compartment and the external surfaces of said housing.

* * * * *